US009778910B2

(12) United States Patent
O'Dwyer et al.

(10) Patent No.: US 9,778,910 B2
(45) Date of Patent: *Oct. 3, 2017

(54) MULTIPLIER PIPELINING OPTIMIZATION WITH A BIT FOLDING CORRECTION

(71) Applicant: Intel Corporation, Santa Clara, CA (US)

(72) Inventors: T. J. O'Dwyer, Cashel (IE); Pierre Laurent, Quin (IE)

(73) Assignee: INTEL CORPORATION, Santa Clara, CA (US)

( * ) Notice: Subject to any disclaimer, the term of this patent is extended or adjusted under 35 U.S.C. 154(b) by 240 days.

This patent is subject to a terminal disclaimer.

(21) Appl. No.: 14/664,669

(22) Filed: Mar. 20, 2015

(65) Prior Publication Data

US 2016/0274866 A1  Sep. 22, 2016

(51) Int. Cl.
*G06F 7/10* (2006.01)
*G06F 7/38* (2006.01)
*G06F 7/533* (2006.01)
*G06F 7/72* (2006.01)

(52) U.S. Cl.
CPC ............. *G06F 7/533* (2013.01); *G06F 7/723* (2013.01)

(58) Field of Classification Search
CPC ....................................... G06F 7/533
USPC ........................................... 708/491
See application file for complete search history.

(56) References Cited

U.S. PATENT DOCUMENTS

| 6,173,304 | B1 * | 1/2001 | Goldovsky | G06F 7/5338 708/630 |
| 2007/0297601 | A1 | 12/2007 | Hasenplaugh et al. | |
| 2010/0293216 | A1 * | 11/2010 | Kim | G06F 7/728 708/491 |
| 2011/0231467 | A1 * | 9/2011 | Ahn | G06F 7/728 708/491 |

OTHER PUBLICATIONS

Hasenplaugh, et al., "Fast Modular Reduction," 18th IEEE Symposium on Computer Arithmetic (ARITH'07), Jun. 25-27, 2007, 5 pages.
U.S. Appl. No. 14/668,349, filed Mar. 25, 2015.
Office Action issued in U.S. Appl. No. 14/668,349, dated Jan. 25, 2017, 11 pages.

* cited by examiner

*Primary Examiner* — Tan V. Mai
(74) *Attorney, Agent, or Firm* — Grossman, Tucker, Perreault & Pfleger, PLLC

(57) ABSTRACT

One embodiment provides a system. The system includes a register to store an operand; a multiplier; and optimizer logic to initiate a square/multiply stage to operate on the operand, initiate a reduction stage prior to completion of the square/multiply stage, and determine whether a carry propagation has occurred.

21 Claims, 3 Drawing Sheets

MULTIPLIER PIPELINING OPTIMIZATION WITH A BIT FOLDING CORRECTION

FIELD

The present disclosure relates to multiplier pipelining optimization, in particular to, multiplier pipelining optimization with a bit folding correction.

BACKGROUND

Cryptography may be utilized to protect data from unwanted access, for authentication, to generate digital signatures, etc. Current cryptographic techniques rely on intensive mathematical operations. For example, a number of public key cryptographic standards (e.g., RSA (Rivest-Shamir-Adleman), Diffie-Hellman, ElGamal, DSA (Digital Signature Algorithm), etc.) are based, at least in part, on modular exponentiation of large numbers. A binary representation of the large numbers may include on the order of thousands, e.g., 1024, 2048, 4096, 8192, etc., or more bits. Modular exponentiation involves raising a first number (base) to some power (exponent) and reducing it with respect to a third number (modulus). A reduction (i.e., modular reduction) result corresponds to a remainder left when the base raised to the exponent is divided by the modulus. Mathematically, modular exponentiation can be expressed as $g^e$ mod M where g is the base, e is the exponent and M is the modulus. Computationally, modular exponentiation includes squaring followed by a reduction and/or multiplying followed by a reduction. Such operations are performed repeatedly in cryptography. Thus, even a relatively small performance increase in a single modular reduction operation can have a significant effect over the relatively large number of modular reduction operations associated with modular exponentiation of large numbers.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
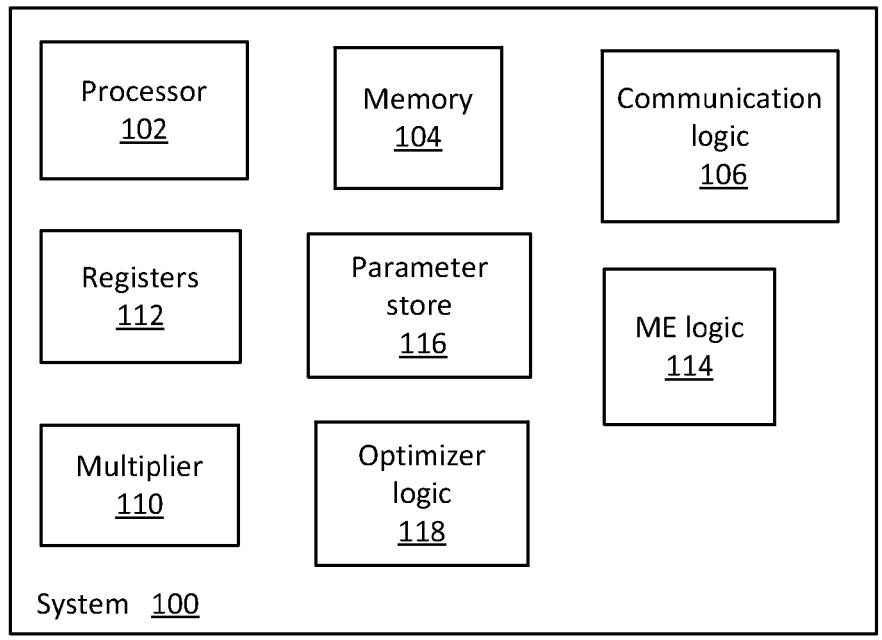
FIG. 1 illustrates a functional block diagram of a system consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

Modular exponentiation for large numbers may be performed by a square-and-multiply technique. Whether to square an operand or square and multiply the operand depends on a value of the exponent. For each square and multiply operation there is a reduction stage to reduce the square/multiplication result modulo the modulus. The reduction stage thus reduces the size (e.g., in bits) of the square/multiplication result to the size of the operand(s) used as input to the square/multiply operation.

One technique for performing modular multiplication and squaring of relatively large numbers includes a combination of "schoolbook" multiplication and a Barrett reduction technique. Schoolbook multiplication generally includes multiplying a multiplicand by each digit of a multiplier to produce a respective intermediate result then shifting and adding the intermediate results to produce a final result. Schoolbook multiplication may be performed from right to left or left to right. Barrett reduction progresses from left to right, using a quotient estimation to subtract a suitable multiple of the modulus. For example, for N and M, two integers with 2n and n bits, respectively, N may be reduced with respect to modulus M by determining a remainder of a division N/M. Modular exponentiation may then be performed via a sequence of square and multiply operations, each followed by a reduction. Thus, at any given point during exponentiation, there are two operands, A and B (where A=B for a square operation), that have size of n bits and a product is generated, N=AB that has size $2n$ bits. N may then be reduced as R=N mod M, where R is an n-bit integer.

Barrett reduction typically includes two n-bit multiplications and an n-bit subtraction. Modified Barrett reduction is a modification of Barrett reduction configured to reduce sizes of the multiplications to fewer than n bits. The modification is termed "folding". Similar to unmodified Barrett reduction, a principle of the reduction method is to efficiently determine an estimate of a quotient q≈N/M followed by a subtraction R=N−qM.

Modified Barrett Reduction includes determining two constants, m prime (m') and mu (µ), in advance (i.e., precomputing m' and µ). The values of m' and µ remain unchanged for the reduce operations (as long as the modulus m does not change). Determining m' and µ in advance avoids determining them during the reduction stages. In other words, precomputing allows m' and µ to be determined once and used a plurality of times. m' and µ may be determined as:

$$m' = 2^{1.5t} \bmod m$$

and $$\mu = \left\lfloor \frac{2^{1.5t}}{m} \right\rfloor$$

where m is the modulus, t is a number of bits in the modulus m and the brackets in m correspond to "floor" which corresponds to a largest integer less than a result of the operations included in the bracket.

Modified Barrett Reduction includes three reduction stages configured to reduce a square/multiply result. In other words, the three reduction stages follow a square stage or a multiply stage and if both a square and a multiply are performed, a sequence is square-reduce-multiply-reduce. As used herein, square/multiply stage corresponds to a square stage or a multiply stage. Thus, a square/multiply stage may be configured to square or multiply. As further used herein, a square/multiply result corresponds to a square result or a multiply result. In a first reduction stage, reduction stage 1, high order digits (e.g., bits) of the square/multiply result are folded to yield a reduced value a' (i.e., reduction stage 1 result) as:

$$a' = a \bmod 2^{1.5t} + m' \cdot \left\lfloor \frac{a}{2^{1.5t}} \right\rfloor \equiv a \bmod m$$

where a is the square/multiply result and a' is the reduction stage 1 result. Folding is configured to decrease a size (e.g., number of bits, digits) of operands multiplied in a Barrett Reduction to reduce computational intensity and to thus improve performance. In other words, a number of bits in operand a (the square/multiply result) is reduced from 2 t to 1.5 t using folding. Thus, the multiplication of m' *floor(a/ $2^{1.5t}$) is a relatively less intensive operation since floor(a/ $2^{1.5t}$) has fewer bits than a has.

In a second reduction stage, reduction stage 2, an estimate of s (s=floor(a/m)) may be determined as:

$$s = \left\lfloor \frac{a'}{2^t} \right\rfloor * \mu$$

s corresponds to an estimate of quotient q. In a third reduction stage, reduction stage 3, an estimate is subtracted from a', the reduction stage 1 result to produce a value which is at least close to a final result as:

$$a' \bmod m \equiv a' - \left\lfloor \frac{\left\lfloor \frac{a'}{2^t} \right\rfloor * \mu}{2^t} \right\rfloor * m = a' - \left\lfloor \frac{s}{2^t} \right\rfloor * m$$

In some situations, there may be additional subtractions of the modulus to achieve the final result, i.e., a remainder less than the modulus m.

In addition to multiplication in the square/multiply stage, the reduction stages themselves include multiplications. For example, reduction stage 1 includes determining a product of m' and floor (a/$2^{1.5t}$). In another example, reduction stage 2 includes determining a product of μ and floor (a'/$2^t$). In another example, reduction stage 3 includes determining a product of m and floor(s/$2^t$).

Thus, a modified Barrett reduction may be performed in three stages. A square/multiply result of the square/multiply stage is input to the first reduction stage and a result of a prior reduction stage is an input to a respective subsequent reduction stage. Thus, each reduction stage depends on a previous result. For example, the first reduction stage is configured to receive a square/multiply result a from the square/multiply stage. In another example, the second reduction stage is configured to receive a', a result of the first reduction stage. In another example, the third reduction stage is configured to receive s, a result of the second reduction stage.

A Modified Barrett Reduction may be performed many times in the determination of a modular exponentiation result. A multiplier (e.g., multiplier circuitry) may be used to perform at least some of the multiplications (and squarings) associated with modular exponentiation. Performance may be enhanced by pipelining operations of the multiplier to achieve at least some parallelism. Performance may be further enhanced by ensuring that the multiplier pipeline has minimal or no gaps in operations. In other words, performance may be further enhanced by ensuring that, once a modular exponentiation has started, the multiplier is fully utilized and thus not idle waiting for a prior result.

Generally, this disclosure relates to a multiplier pipelining optimization with a bit folding correction. The optimization is configured to be applied to a square or a multiply ("square/multiply") stage and a first reduction stage of a modified Barrett reduction. The methods and systems are configured to initiate multiplication operations associated with the first reduction stage prior to completion of operations associated with the square/multiply stage. Initiating multiplication operations associated with reduction stage 1 prior to completion of operations associated with the square/ multiply stage is configured to ensure that a multiplier is fully utilized, i.e., that there are no gaps in the pipeline between stages.

Initiating reduction stage 1 prior to completion of the square/multiply stage may not capture a carry propagation that affects the square/multiply stage result and thus the reduction stage 1 result. Occurrence of a carry propagation is configured to trigger a correction of the result of reduction stage 1, i.e., a bit folding correction, based, at least in part, on the carry propagation. The bit folding correction may be implemented by adding m' at a selected offset to the result of reduction stage 1 and, thus, the carry propagation may be accommodated. Such a correction may have little or no detrimental effect on a performance improvement associated with fully utilizing the multiplier since a likelihood of occurrence of a carry propagation is extremely small. The method and system may be configured to reorder operations associated with the square/multiply stage to reduce a likelihood of a carry propagation occurring in the square/ multiply stage.

FIG. 1 illustrates a system block diagram of a system 100 consistent with several embodiments of the present disclosure. System 100 may correspond to and/or be included in a computing device, including, but not limited to, a server, a workstation computer, a desktop computer, a laptop computer, a tablet computer (e.g., iPad®, GalaxyTab® and the like), an ultraportable computer, an ultramobile computer, a netbook computer and/or a subnotebook computer, a mobile telephone including, but not limited to, a smart phone, (e.g., iPhone®, Android®-based phone, Blackberry®, Symbian®-based phone, Palm®-based phone, etc.), etc.

System 100 includes a processor 102, memory 104, communication logic 106, a multiplier 110, a plurality of registers 112, modular exponentiation (ME) logic 114, a parameter store 116 and optimizer logic 118. Processor 102 is configured to perform operations associated with system 100. Processor 102 may include one or more processing unit(s). Memory 104 includes any type of memory technology, as described herein. Communication logic 106 is configured to provide communication of commands and/or data to and/or from system 100. Such commands and/or data may be encrypted.

Registers 112 are configured to hold one or more parameters and/or operands related to modular exponentiation, as described herein. Parameter store 116 is configured to store precomputed parameters, e.g., m' and μ. ME logic 114 is configured to manage operations associated with modular exponentiation, as described herein.

Multiplier 110 is configured to multiply a plurality of operands and to provide a result. For example, multiplier 110 may receive at least one operand from registers 112 and provide a result to registers 112. In another example, multiplier 110 may receive a parameter from parameter store 116. ME logic 114 may control provision of operands and/or parameters to multiplier 110 and may be configured to capture one or more results from multiplier 112.

Multiplier 110 has a bit width, w. The multiplier bit width corresponds to a size of operand element that the multiplier 110 can multiply. For example, multiplier 110 bit width may be 512 bits. Continuing with this example, multiplier 110 may receive two operand elements, each with a bit width of 512, and may produce a product (i.e., square/multiply result) of 1024 bits. In another example, multiplier bit width may be greater than or less than 512 bits. An operand may include one or more operand elements that together form the operand. For example, a bit width of an operand may be 2048, 4096, 8192, etc. Thus, a 2048-bit width operand may correspond to four multiplier bit widths.

Operations of multiplier 110 may be pipelined. Pipelining is configured to enhance performance by facilitating parallel operations of a component, e.g., multiplier 110. Pipelining may have an associated pipeline depth that corresponds to a number of operations that may be performed in parallel at given point in time. For example, multiplier 110 pipeline depth may be 3. In other examples, the pipeline depth associated with multiplier 110 may be more or less than 3.

Optimizer logic 118 is configured to manage optimization of modular exponentiation operations. Optimizer logic 118 may be configured to reorder operations of multiplier 110. For example, optimizer logic 118 may be configured to initiate a square/multiply stage to operate on an operand and to initiate a first reduction stage prior to completion of the square/multiply stage, as described herein. In another example, optimizer logic 118 may be configured to reorder provision of a plurality of operand elements to multiplier 110. The reordering is configured to reduce a likelihood that a carry propagation will occur. Optimizer logic 118 may be configured to determine whether a carry propagation has occurred during the square/multiply stage related to the result of reduction stage 1. Optimizer logic 118 may be further configured to detect the carry bit(s) and perform a bit folding correction in reduction stage 1 if the carry propagation has occurred. The bit folding correction may include adding m' at a selected offset to the result (i.e., a') of reduction stage 1 to correct the result, as described herein.

Figure 2:
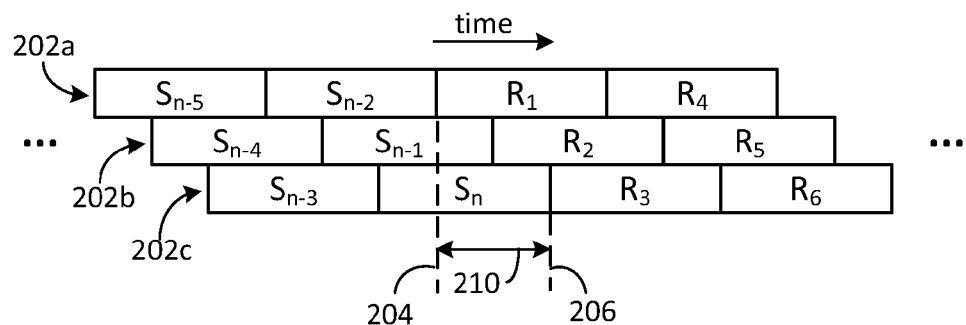
FIG. 2 illustrates an example pipeline consistent with various embodiments of the present disclosure.

FIG. 2 illustrates an example pipeline 200 consistent with various embodiments of the present disclosure. Example pipeline 200 corresponds to pipeline with depth three. Pipeline depth is related to a number of parallel operations that may be performed by a component, e.g., multiplier 110, that is executing the operations of the pipeline. Thus, example pipeline 200 includes three sequences 202a, 202b, 202c, of pipelined operations.

Example pipeline 200 illustrates order of operations of two stages, S and R, where a result of the first stage S is an input to the second stage R. In other words, R relies on completion of the operations associated with S in order to perform its operations. For example, stage S may correspond to a square/multiply stage associated with modular exponentiation and stage R may correspond to a first reduction stage of a modified Barrett reduction, as described herein. Each stage S, R includes a plurality of operations $S_{n-5}$, $S_{n-4}$, $S_{n-3}$, $S_{n-2}$, $S_{n-1}$ and $S_n$ and $R_1$, $R_2$, $R_3$, $R_4$, $R_5$ and $R_6$, respectively, that are distributed across the pipeline 200. For example, the first pipe 202a includes operations $S_{n-5}$, $S_{n-2}$, $R_1$ and $R_4$, the second pipe 202b includes operations $S_{n-4}$, $S_{n-1}$, $R_2$ and $R_5$ and the third pipe 202c includes operations $S_{n-3}$, $S_n$, $R_3$ and $R_6$.

Time is increasing from left to right in FIG. 2. Thus, $S_n$ corresponds to a last operation of stage S that completes at time 206 and $R_1$ corresponds to a first operation of stage R that starts at time 204. Time 210 is a difference between stage S completion time 206 and stage R initiation time 204 and represents an overlap between stage S and R. Typically, when a second stage depends on a result from a first stage, no overlap is allowed, and initiation of operations of stage R may be delayed until stage S completion time 206. Such a delay may then result in a gap in pipeline 200 when the component executing the pipeline, e.g., multiplier 110, may be idle and thus underutilized. Performance may then be less than optimal.

Figures 3A, 3B:
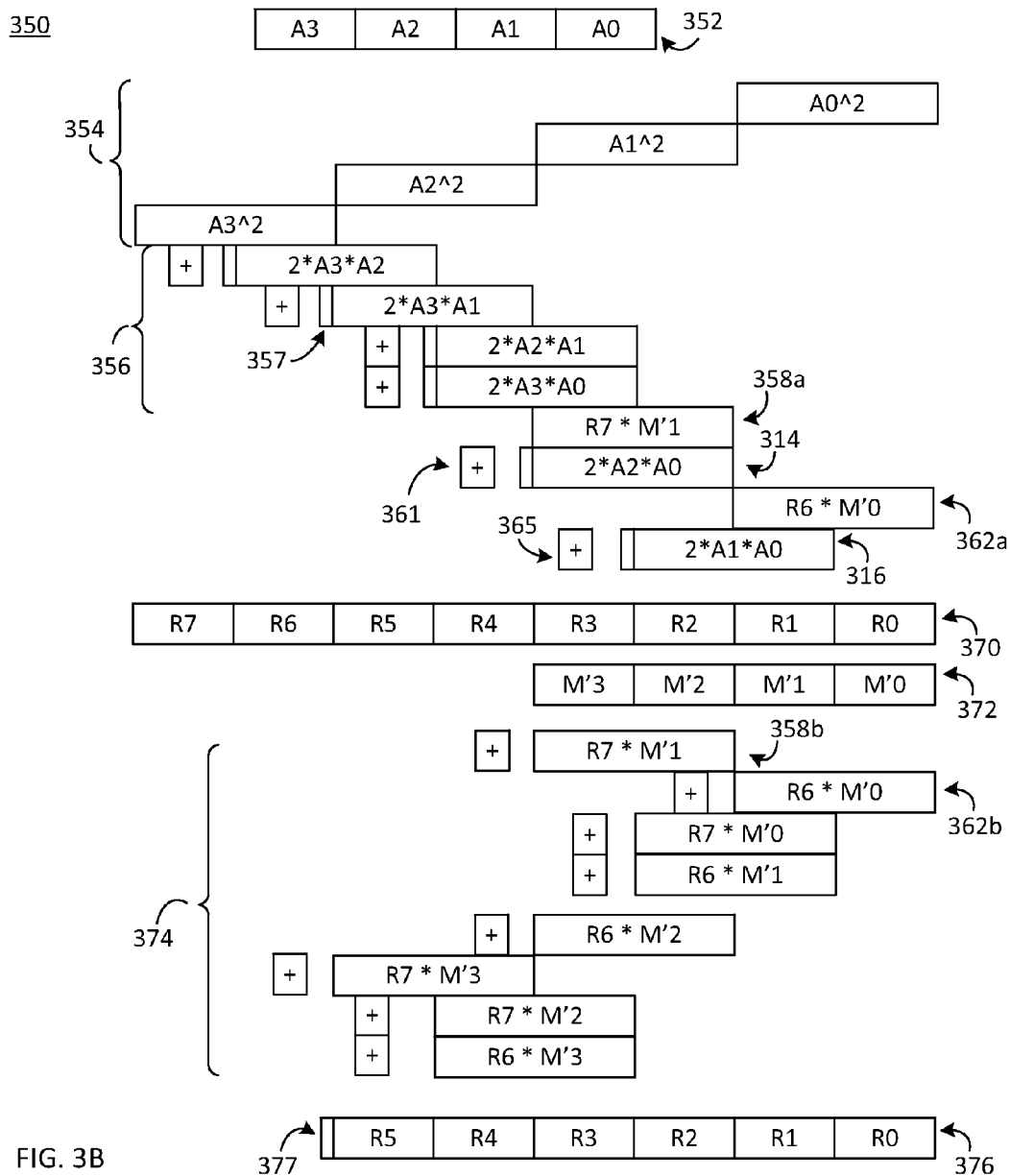
FIG. 3A illustrates an example multiplier pipeline of depth three consistent with one embodiment of the present disclosure.
FIG. 3B illustrates an operational flow diagram related to FIG. 3A.

FIG. 3A illustrates an example multiplier pipeline 300 of depth three consistent with one embodiment of the present disclosure. FIG. 3B illustrates an operational flow diagram 350 related to FIG. 3A. Example 300, 350 correspond to a square stage followed by a first reduction stage of a modified Barrett reduction. The multiplier pipeline optimization may be similarly applied to a multiply stage, within the scope of the present disclosure. FIGS. 3A and 3B may be best understood when considered together.

Multiplier pipeline 300 and operational flow diagram 350 illustrate a square/multiply stage (i.e., determination of $A^2$ given A) and a reduction stage 1 (i.e., determination of a' based on $A^2$ and m') of a modified Barrett reduction, as described herein. In this example, a bit width, i.e., size, of operand A is t, a bit width of $A^2$ is 2*t and t=4*w, where w is the bit width of a multiplier, e.g., multiplier 110 of FIG. 1, configured to perform multiplication operations. In general, t is greater than w and t=4*w is one non-limiting example. Pipeline 300 illustrates an order of operations and operational flow diagram 350 illustrates details of the operations and results. Pipeline 300 and operational flow diagram 350 further illustrate one example of a multiplier pipelining optimization using a bit folding correction consistent with the present disclosure.

Turning to FIG. 3A, example multiplier pipeline 300 has a depth of three, i.e., pipes 302, 304, 306. Pipelines of greater and lesser depths may be utilized consistent with the present disclosure. Each pipe 302, 304, 306 includes a plurality of respective operations and each operation generally includes a multiplication. Operations 310 (i.e., R7*M'1) and 312 (i.e., R6*M'0) are associated with reduction stage 1 and are configured to be initiated prior to completion of the square/multiply stage. Operations 314 (i.e., 2*A2*A0) and 316 (i.e., 2*A1*A0) are associated with the square/multiply stage. Operation 314 and/or operation 316 may not be complete when operations 310 and/or 312 are initiated. In this example, the square/multiply stage completes when operation 316 completes. Pipeline 300 illustrates a multiplier pipelining optimization configured to eliminate gaps and associated multiplier idle time between the square/multiply stage and reduction stage 1.

Turning to FIG. 3B, operational flow diagram 350 illustrates operations 354, 356, 314 and 316 associated with the square/multiply stage and operations 374 associated with reduction stage 1. Operation 358a corresponds to reduction stage 1 operation 358b and is initiated prior to completion of the square/multiply stage. Operations 358a, 358b correspond to operation 310 of FIG. 3A. Similarly, operations 362a corresponds to reduction stage 1 operation 362b and is initiated prior to completion of the square/multiply stage. Operations 362a, 362b correspond to operation 312 of FIG. 3A. In other words, operations 358a and 358b, illustrated as two operations in operational flow diagram 350 are actually one reduction stage 1 operation that is initiated prior to completion of the square/multiply stage and whose result is utilized in reduction stage 1. Similarly, operations 362a and 362b are actually one reduction stage 1 operation that is initiated prior to completion of the square/multiply stage and whose result is utilized in reduction stage 1.

Input to the square/multiply stage is an operand to be squared (i.e., A) 352. An output of the square/multiply stage (R7:R0 result 370) corresponds to $A^2$. A0 through A3 of operand 352 may be included in registers 112. A0 through A3 of operand 352 correspond to operand elements. A3 of operand 352 corresponds to a most significant operand element of operand 352 and A0 of operand 352 corresponds to a least significant operand element of operand 352. The bit width of each of A0 through A3 of operand 352 corresponds to a multiplier, e.g., multiplier 110, bit width w. In this example 350, left-right position corresponds to bit position in an operand and/or parameter and top to bottom is related to order of operations. Particular order of operations is illustrated by pipeline 300.

Example 350 illustrates determination of $A^2$ based on operand 352 and determination of a' based on $A^2$ and m' using folding, both using schoolbook multiplication, as described herein. A square ($A^2$) of operand 352 (i.e., operand elements A3:A0) may be determined by operations 354, 356, 314 and 316. Operations 354 include squaring each operand element A3, A2, A1 and A0. Operations 356, 314, 316 include determining cross terms, i.e., 2*Ax*Ay, x≠y, x=0, 1, 2, 3, y=0, 1, 2, 3. Because of the factor 2 in the cross terms, each cross term may be w+1 bits wide, thus an additional bit, e.g., bit 357, prepends the 2 w width to form each element. Addition operations are indicated by plus signs, e.g., plus signs 361, 365. Each plus sign 361, 365, indicates an addition operation of the value to the right of the respective plus sign. Squared elements and cross terms may be accumulated, i.e., added, in an intermediate result, i.e., R7:R0 result 370. Thus, at the completion of the square/multiply stage, result 370 is configured to hold the square of operand A.

Intermediate result 370 (i.e., square/multiply result $A^2$) and parameter m' (i.e., M'3:M'0 parameter 372) are input to reduction stage 1 and operations 374. M'3, M'2, M'1 and M'0 are elements of parameter m' and each has a bit width w. Additions are accumulated in R5:R0 reduction stage result 376. A multiplier, e.g., multiplier 110, may be configured to multiply R7 and R6 of intermediate result 370 by M'3, M'2, M'1 and M'0. The multiplication results of operations 374 may be added to appropriate operand elements R5 through R0 of result 376 to yield reduction stage 1 result. Result 376 includes six elements of bit width w and (possibly) a carry bit 377 since a carry may occur as a result of an addition operation.

Thus, examples 300, 350 illustrate determination of a=$A^2$ (the result of the square/multiply stage) and a' (the result of reduction stage 1). The multiplication operations may be pipelined in multiplier 110, as described herein.

Turning now to FIG. 3A, in a conventional pipelined multiplication, operation 310 may not be initiated until operation 316 has completed. In other words, reduction stage 1 may not be initiated until the square/multiply stage has completed. Such a configuration results in gaps in the pipeline 300 after operations 316, 314 and 318, multiplier underutilization and thus may have less than optimal performance. In an optimized multiplier pipeline with a bit folding correction, consistent with the present disclosure, such gaps may be eliminated and performance may be improved by initiating operations 310, 312 prior to completion of the square/multiply stage.

Operation 312 (i.e., R6*M'0), that corresponds to operations 362a, 362b, includes operand element R6 of result 370. Operation 310 (i.e., R7*M'1), that corresponds to operations 358a, 358b, includes operand element R7 of result 370. When operations 310 and 312 are initiated, prior to completion of the square/multiply stage, R6 and R7 of result 370 may contain temporary (i.e., not yet final) respective values. For example, operation 314 (i.e., 2*A2*A0) that completes after operation 310 is initiated may affect R7 of result 370 via a carry propagation from operand element R3 of result 370 as a result of addition 361. Since operation 310 includes multiplying R7 by M'1 and operation 310 is initiated prior to completion of operation 314, such a carry propagation may not be captured in operation 310. In other words, the temporary value of R7, that may not include the propagated carry, is used in operation 310. Operation 314 may further affect R6 of result 370 via a carry from addition 361. However, operation 314 is configured to complete prior to initiation of operation 312 that includes R6 of result 370, thus, R6 may contain its associated final value that includes the propagated carry, if any.

Similarly, operation 316 (i.e., 2*A1*A0) may affect R6 of result 370 via a carry propagation from addition 365. Since operation 312 includes multiplying R6 by M'0 and operation 312 is initiated prior to completion of operation 316, such a carry propagation may not be captured in operation 312. In other words, the temporary value of R6 of result 370, that may not include the propagated carry, if any, is used in operation 312.

Propagating carry(ies) associated with addition(s) 361 and/or 365 that may affect R7 and/or R6 of result 370 may be detected during and/or after the square/multiply stage by, e.g., optimizer logic 118. The reduction stage 1 result 376 may then be corrected based, at least in part, on the detected propagated carry(ies). For example, if a carry propagates to R7 in the square/multiply stage, result 376 may be corrected by adding m' (i.e., M'3:M'0) left shifted by element width w (i.e., m'<<w) to reduction stage 1 result 376. In another example, if a carry propagates to R6 in the square/multiply stage, reduction stage 1 result 376 may be corrected by adding m' to reduction stage 1 result 376. In other words, propagated carry(ies) not accounted for in the temporary value(s) of R6 and/or R7 of result 370 may be accounted for (i.e., corrected) during the reduction stage 1. Thus, optimizer logic 118 may be configured to perform a bit folding correction of reduction stage 1 result a' after a completion of the square/multiply stage and prior to a completion of reduction stage 1 in response to detecting propagated carry(ies) in the square/multiply stage.

It may be appreciated that a likelihood (i.e., probability) that a carry will propagate into R7 or R6 is $2^{-(3w-1)}$. The likelihood that a carry will propagate into R7 or R6 is quite small (but is not impossible). Thus, frequency of correcting for a carry propagation is similarly quite small so that such correction has little or no effect on performance. The likelihood that a carry will propagate into higher order operand elements may be affected by an order of operations in the square/multiply stage. Schoolbook multiplication may often be performed from right to left (i.e., least significant operand element to most significant operand element) but may also proceed left to right (most significant operand element to least significant operand element). The likelihood of carry propagation into higher order elements may be reduced by proceeding left to right and determining relatively more significant intermediate results that include the most significant operand element prior to determining relatively less significant intermediate results that include the least significant operand element.

Square/multiply stage operations of example 350 may be configured to proceed from right to left by executing at least operations 356, 316 and 318 from the bottom up. Square/multiply stage operations of example 350 may be ordered from the top down generally according to left to right schoolbook multiplication. Reordering the square/multiply stage to correspond to left to right schoolbook multiplication is configured to reduce a likelihood of carry propagation into R7 and/or R6 of result 370, as described herein.

Thus, performance related to modular exponentiation may be improved by eliminating gaps in a multiplier pipeline and reordering operations to reduce the likelihood of a carry propagation. For example, for a pipeline of depth three and assuming that each multiplier of width w consumes three time units for each multiplication, performance may be improved by about 9%.

Figure 4:
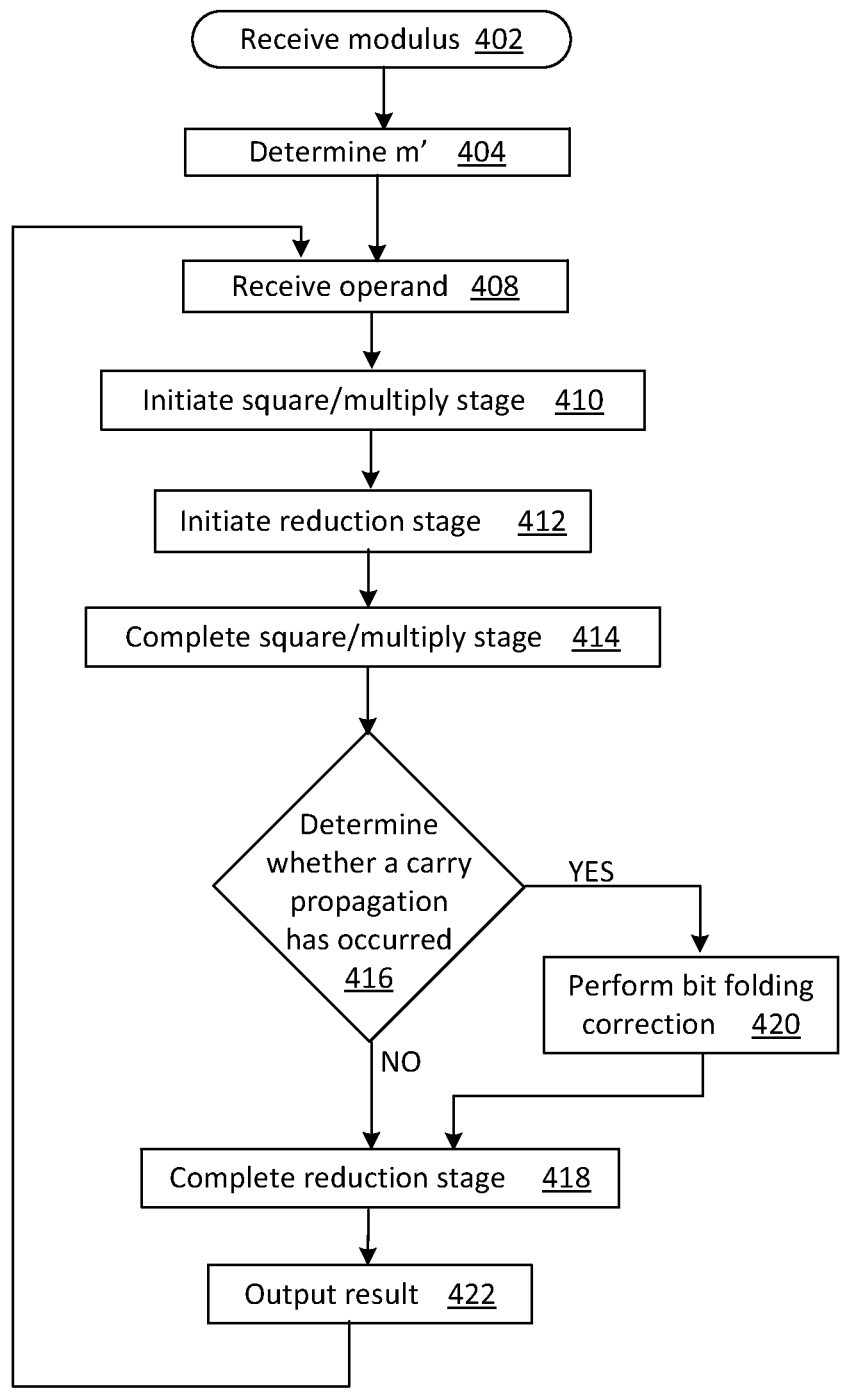
FIG. 4 is a flowchart of multiplier pipelining optimization operations according to one embodiment of the present disclosure.

FIG. 4 is a flowchart 400 of multiplier pipelining optimization operations according to one embodiment of the present disclosure. The operations may be performed, for example, by system 100, in particular, optimizer logic 118, multiplier 110 and/or ME logic 114 of FIG. 1.

Operations of this embodiment may begin with receiving a modulus 402. A constant parameter, m', may be determined at operation 404. For example, the constant parameter m' may be related to a modified Barrett reduction, as described herein. Operation 408 includes receiving an operand. The operand may be related to a modular exponentiation. A square/multiply stage may be initiated at operation 410. A reduction stage may be initiated at operation 412. The square/multiply stage may complete at operation 414.

Whether a carry propagation has occurred may be determined at operation 416. For example, a carry propagation may correspond to a carry from a lower order intermediate result element. If a carry propagation has not occurred, the reduction stage may complete at operation 418. If a carry propagation has occurred, a bit folding correction may be performed at operation 420 and program flow may proceed to operation 418. Operations 416 and 420 may be performed before or after operation 414. A result may be output at operation 422. For example, the result may correspond to a reduction stage 1 result, i.e., a'. Program flow may then proceed to operation 408.

Thus, a bit folded square/multiplication result related to a modified Barrett reduction may be determined and multiplier operation may be optimized.

While the flowchart of FIG. 4 illustrate operations according various embodiments, it is to be understood that not all of the operations depicted in FIG. 4 are necessary for other embodiments. In addition, it is fully contemplated herein that in other embodiments of the present disclosure, the operations depicted in FIG. 4, and/or other operations described herein may be combined in a manner not specifically shown in any of the drawings, and such embodiments may include less or more operations than are illustrated in FIG. 4. Thus, claims directed to features and/or operations that are not exactly shown in one drawing are deemed within the scope and content of the present disclosure.

Memory 104 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Generally, this disclosure relates to a multiplier pipelining optimization with a bit folding correction. The optimization is configured to be applied to a square/multiply stage and a first reduction stage of a modified Barrett reduction. The methods and systems are configured to initiate multiplication operations associated with the first reduction stage prior to completion of operations associated with the square/multiply stage. Initiating multiplication operations associated with reduction stage 1 prior to completion of operations associated with the square/multiply stage is configured to ensure that a multiplier is fully utilized, i.e., that there are no gaps in the pipeline between stages.

Initiating reduction stage 1 prior to completion of the square/multiply stage may not capture a carry propagation that affects the square/multiply stage result and thus the reduction stage 1 result. Occurrence of a carry propagation is configured to trigger a correction of the result of reduction stage 1, i.e., a bit folding correction, based, at least in part, on the carry propagation. The bit folding correction may be implemented by adding m' at a selected offset to the result of reduction stage 1 and, thus, the carry propagation may be accommodated. Such a correction may have little or no detrimental effect on a performance improvement associated with fully utilizing the multiplier since a likelihood of occurrence of a carry propagation is extremely small. The method and system may be configured to reorder operations associated with the square/multiply stage to reduce a likelihood of a carry propagation occurring in the square/multiply stage.

EXAMPLES

Examples of the present disclosure include subject material such as a method, means for performing acts of the method, a device, or of an apparatus or system related to a multiplier pipelining optimization with a bit folding correction, as discussed below.

Example 1

According to this example there is provided a system. The system includes a register to store an operand; a multiplier; and optimizer logic to initiate a square/multiply stage to operate on the operand, initiate a reduction stage prior to completion of the square/multiply stage, and determine whether a carry propagation has occurred.

Example 2

This example includes the elements of example 1, wherein the optimizer logic is further to perform a bit folding correction of a result of the reduction stage if the carry propagation has occurred.

Example 3

This example includes the elements of example 1, wherein the optimizer logic is further to reorder provision of a plurality of elements of the operand to the multiplier, the reordering to reduce a likelihood that the carry propagation will occur.

Example 4

This example includes the elements according to any one of examples 1 through 3, wherein the multiplier is to perform a plurality of pipelined multiplications of a plurality of elements of the operand.

Example 5

This example includes the elements according to any one of examples 1 through 3, further including modular exponentiation (ME) logic and a parameter store, the ME logic to precompute a constant parameter m' and to store the constant parameter in the parameter store.

Example 6

This example includes the elements according to any one of examples 1 through 3, wherein the operand is related to modular exponentiation.

Example 7

This example includes the elements according to any one of examples 1 through 3, wherein the reduction stage is related to a modified Barrett reduction.

Example 8

This example includes the elements according to any one of examples 1 through 3, wherein a bit width of the multiplier is less than a number of bits in the operand.

Example 9

This example includes the elements according to any one of examples 1 through 3, wherein the reduction stage overlaps the square/multiply stage.

Example 10

This example includes the elements according to any one of examples 1 through 3, wherein the multiplier is to operate as a pipeline to perform a plurality of operations in parallel.

Example 11

This example includes the elements according to any one of examples 1 through 3, wherein a bit width of the operand is in the range of 512 to 8192 bits.

Example 12

This example includes the elements according to any one of examples 1 through 3, wherein the optimizer logic is further to provide a result of the square/multiply stage to the reduction stage.

Example 13

This example includes the elements of example 12, wherein the optimizer logic is further to provide the result of the square/multiply stage to the reduction stage after a completion of the square/multiply stage.

Example 14

According to this example there is provided a method. The method includes initiating, by optimizer logic, a square/multiply stage to operate on an operand; initiating, by the optimizer logic, a reduction stage prior to completion of the square/multiply stage; and determining, by the optimizer logic, whether a carry propagation has occurred.

Example 15

This example includes the elements of example 14, and further includes performing, by the optimizer logic, a bit folding correction to a result of the reduction stage if the carry propagation has occurred.

Example 16

This example includes the elements of example 14, and further includes reordering, by the optimizer logic, provision of a plurality of elements of the operand to a multiplier, the reordering to reduce a likelihood that the carry propagation will occur.

Example 17

This example includes the elements of example 14, and further includes performing, by a multiplier, a plurality of pipelined multiplications of a plurality of elements of the operand.

Example 18

This example includes the elements of example 14, and further includes precomputing, by modular exponentiation (ME) logic, a constant parameter m'; and storing, by the ME logic, the constant parameter in a parameter store.

Example 19

This example includes the elements of example 14, wherein the operand is related to modular exponentiation.

Example 20

This example includes the elements of example 14, wherein the reduction stage is related to a modified Barrett reduction.

Example 21

This example includes the elements of example 14, wherein a bit width of a multiplier is less than a number of bits in the operand.

Example 22

This example includes the elements of example 14, wherein the reduction stage overlaps the square/multiply stage.

Example 23

This example includes the elements of example 14, and further includes operating, by a multiplier, as a pipeline to perform a plurality of operations in parallel.

Example 24

This example includes the elements of example 14, wherein a bit width of the operand is in the range of 512 to 8192.

Example 25

This example includes the elements of example 14, and further includes providing, by the optimizer logic, a result of the square/multiply stage to the reduction stage.

Example 26

This example includes the elements of example 25, wherein the result of the square/multiply stage is provided to the reduction stage after a completion of the square/multiply stage.

Example 27

According to this example there is provided a computer readable storage device having stored thereon instructions that when executed by one or more processors result in the following operations including initiating a square/multiply stage to operate on an operand; initiating a reduction stage prior to completion of the square/multiply stage; and determining whether a carry propagation has occurred.

Example 28

This example includes the elements of example 27, wherein the instructions that when executed by one or more processors results in the following additional operations including performing a bit folding correction of a result of the reduction stage if the carry propagation has occurred.

Example 29

This example includes the elements of example 27, wherein the instructions that when executed by one or more processors results in the following additional operations including reordering provision of a plurality of elements of the operand to a multiplier, the reordering to reduce a likelihood that the carry propagation will occur.

Example 30

This example includes the elements according to any one of examples 27 through 29, wherein the instructions that when executed by one or more processors results in the following additional operations including performing a plurality of pipelined multiplications of a plurality of elements of the operand.

Example 31

This example includes the elements according to any one of examples 27 through 29, wherein the instructions that when executed by one or more processors results in the following additional operations including precomputing a constant parameter m'; and storing the constant parameter in a parameter store.

Example 32

This example includes the elements according to any one of examples 27 through 29, wherein the operand is related to modular exponentiation.

Example 33

This example includes the elements according to any one of examples 27 through 29, wherein the reduction stage are related to a modified Barrett reduction.

Example 34

This example includes the elements according to any one of examples 27 through 29, wherein a bit width of a multiplier is less than a number of bits in the operand.

Example 35

This example includes the elements according to any one of examples 27 through 29, wherein the reduction stage overlaps the square/multiply stage.

Example 36

This example includes the elements according to any one of examples 27 through 29, wherein the instructions that when executed by one or more processors results in the following additional operations including operating as a pipeline to perform a plurality of operations in parallel.

Example 37

This example includes the elements according to any one of examples 27 through 29, wherein a bit width of the operand is in the range of 512 to 8192.

Example 38

This example includes the elements according to any one of examples 27 through 29, wherein the instructions that when executed by one or more processors results in the following additional operations including providing a result of the square/multiply stage to the reduction stage.

Example 39

This example includes the elements of example 38, wherein the result of the square/multiply stage is provided to the reduction stage after a completion of the square/multiply stage.

Example 40

According to this example there is provided a device. The device includes means for initiating, by optimizer logic, a square/multiply stage to operate on an operand; means for initiating, by the optimizer logic, a reduction stage prior to completion of the square/multiply stage; and determining, by the optimizer logic, whether a carry propagation has occurred.

Example 41

This example includes the elements of example 40, and further includes means for performing, by the optimizer logic, a bit folding correction to a result of the reduction stage if the carry propagation has occurred.

Example 42

This example includes the elements of example 40, and further includes means for reordering, by the optimizer logic, provision of a plurality of elements of the operand to a multiplier, the reordering to reduce a likelihood that the carry propagation will occur.

Example 43

This example includes the elements according to any one of examples 40 through 42, and further includes means for performing, by a multiplier, a plurality of pipelined multiplications of a plurality of elements of the operand.

Example 44

This example includes the elements according to any one of examples 40 through 42, and further includes means for precomputing, by modular exponentiation (ME) logic, a constant parameter m'; and means for storing, by the ME logic, the constant parameter in a parameter store.

Example 45

This example includes the elements according to any one of examples 40 through 42, wherein the operand is related to modular exponentiation.

Example 46

This example includes the elements according to any one of examples 40 through 42, wherein the reduction stage is related to a modified Barrett reduction.

Example 47

This example includes the elements according to any one of examples 40 through 42, wherein a bit width of a multiplier is less than a number of bits in the operand.

Example 48

This example includes the elements according to any one of examples 40 through 42, wherein the reduction stage overlaps the square/multiply stage.

Example 49

This example includes the elements according to any one of examples 40 through 42, and further includes means for operating, by a multiplier, as a pipeline to perform a plurality of operations in parallel.

Example 50

This example includes the elements according to any one of examples 40 through 42, wherein a bit width of the operand is in the range of 512 to 8192.

Example 51

This example includes the elements according to any one of examples 40 through 42, and further includes means for providing, by the optimizer logic, a result of the square/multiply stage to the reduction stage.

Example 52

This example includes the elements of example 51, wherein the result of the square/multiply stage is provided to the reduction stage after a completion of the square/multiply stage.

Example 53

According to this example there is a computer readable storage device having stored thereon instructions that when executed by one or more processors result in the following operations including the method according to any one of examples 14 through 26.

Example 54

Another example of the present disclosure is a system including at least one device arranged to perform the method of any one of examples 14 through 26.

Example 55

Another example of the present disclosure is a device including means to perform the method of any one of examples 14 through 26.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system comprising:
   a register to store an operand;
   a multiplier; and
   optimizer logic to initiate a square/multiply stage to operate on the operand, initiate a reduction stage prior to completion of the square/multiply stage, and determine whether a carry propagation has occurred,
   the square/multiply stage comprising squaring, by the multiplier, the operand, the squaring comprising squaring each element of the operand, determining each cross term and adding each squared element and each cross term to an intermediate result,
   the reduction stage comprising multiplying, by the multiplier, an operand element of the intermediate result and a plurality of elements of a parameter, m'.

2. The system of claim 1, wherein the optimizer logic is further to perform a bit folding correction of a result of the reduction stage if the carry propagation has occurred.

3. The system of claim 1, wherein the optimizer logic is further to reorder provision of a plurality of elements of the operand to the multiplier, the reordering to reduce a likelihood of occurrence of the carry propagation.

4. The system of claim 1, wherein the squaring and multiplication operations of the multiplier are pipelined.

5. The system of claim 1, further comprising modular exponentiation (ME) logic and a parameter store, the ME logic to precompute the constant parameter m' and to store the constant parameter in the parameter store.

6. The system of claim 1, wherein the operand is related to modular exponentiation.

7. The system of claim 1, wherein the reduction stage is related to a modified Barrett reduction.

8. A method comprising:
   initiating, by optimizer logic, a square/multiply stage to operate on an operand;
   initiating, by the optimizer logic, a reduction stage prior to completion of the square/multiply stage; and
   determining, by the optimizer logic, whether a carry propagation has occurred,
   the square/multiply stage comprising squaring, by the multiplier, the operand, the squaring comprising squaring each element of the operand, determining each cross term and adding each squared element and each cross term to an intermediate result,
   the reduction stage comprising multiplying, by the multiplier, an operand element of the intermediate result and a plurality of elements of a parameter, m'.

9. The method of claim 8, further comprising:
   performing, by the optimizer logic, a bit folding correction of a result of the reduction stage if the carry propagation has occurred.

10. The method of claim 8, further comprising:
    reordering, by the optimizer logic, provision of a plurality of elements of the operand to a multiplier, the reordering to reduce a likelihood of occurrence of the carry propagation.

11. The method of claim 8,
    wherein the squaring and multiplication operations of the multiplier are pipelined.

12. The method of claim 8, further comprising:
    precomputing, by modular exponentiation (ME) logic, the constant parameter m'; and
    storing, by the ME logic, the constant parameter in a parameter store.

13. The method of claim 8, wherein the operand is related to modular exponentiation.

14. The method of claim 8, wherein the reduction stage is related to a modified Barrett reduction.

15. A computer readable storage device having stored thereon instructions that when executed by one or more processors result in the following operations comprising:
    initiating a square/multiply stage to operate on an operand;
    initiating a reduction stage prior to completion of the square/multiply stage; and
    determining whether a carry propagation has occurred,
    the square/multiply stage comprising squaring, by the multiplier, the operand, the squaring comprising squaring each element of the operand, determining each cross term and adding each squared element and each cross term to an intermediate result,
    the reduction stage comprising multiplying, by the multiplier, an operand element of the intermediate result and a plurality of elements of a parameter, m'.

16. The device of claim 15, wherein the instructions that when executed by one or more processors results in the following additional operations comprising:
    performing a bit folding correction of a result of the reduction stage if the carry propagation has occurred.

17. The device of claim 15, wherein the instructions that when executed by one or more processors results in the following additional operations comprising:
    reordering provision of a plurality of elements of the operand to a multiplier, the reordering to reduce a likelihood of occurrence of the carry propagation.

18. The device of claim 15, wherein the squaring and multiplication operations of the multiplier are pipelined.

19. The device of claim 15, wherein the instructions that when executed by one or more processors results in the following additional operations comprising:
    precomputing the constant parameter m'; and
    storing the constant parameter in a parameter store.

20. The device of claim 15, wherein the operand is related to modular exponentiation.

21. The device of claim 15, wherein the reduction stage is related to a modified Barrett reduction.

* * * * *